Figure 1:
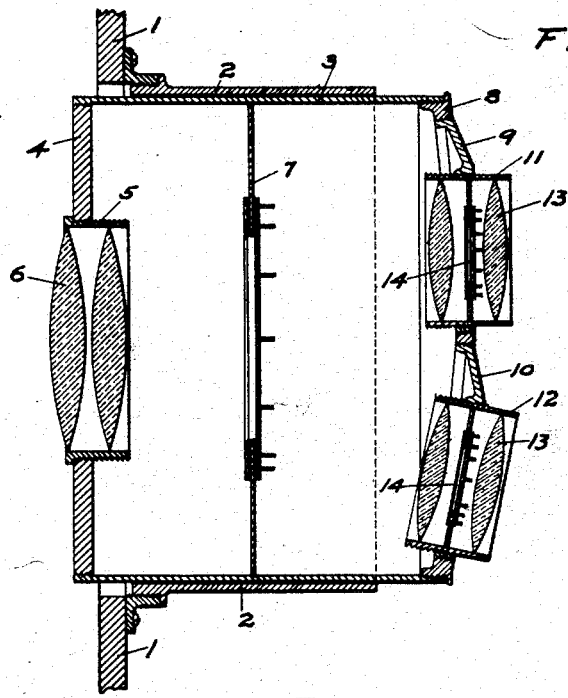

G. E. WATTS.
CAMERA LENS.
APPLICATION FILED OCT. 18, 1915.

1,193,851. Patented Aug. 8, 1916.

Lenses 13-13 direct light to lens 6 from a plurality of directions

Witnesses:
J. C. Strong
I. M. Griffin

George E. Watts, Inventor,
By _____, Atty.

UNITED STATES PATENT OFFICE.

GEORGE E. WATTS, OF PORTLAND, OREGON.

CAMERA-LENS.

1,193,851.  Specification of Letters Patent.  Patented Aug. 8, 1916.

Application filed October 18, 1915. Serial No. 56,567.

*To all whom it may concern:*

Be it known that I, GEORGE E. WATTS, a citizen of the United States, residing in the city of Portland, county of Multnomah, and State of Oregon, have invented certain new and useful Improvements in Camera-Lenses, of which the following is a specification.

My invention relates to camera lenses, and more particularly to certain improvements in camera lenses which are especially adapted for use in taking moving pictures, although I do not intend that the use of my invention shall be limited.

Among the salient objects of my invention are,—to provide in combination with a single barrel and a main lens, a plurality of directing lenses so positioned relative to each other and to said main lens that they will reproduce, or direct, different images from different positions, simultaneously, or separately, through said main lens and through an aperture in the aperture plate; to provide in a device of the character referred to, directing lenses capable of adjustment to different positions relative to said main lens and to each other; to provide in combination with said directing lenses diaphragms, whereby an image through any one of said directing lenses can be cut off until the proper time when it is desired to throw that particular image through the main lens and the aperture plate, thus making it possible while reproducing one image, or a series of images, through one of said directing lenses and said main lens, to also bring in through another of said directing lenses at the desired moment, another image, such for example, as a visionary image.

In order that others may clearly understand my invention, I have illustrated one practical embodiment thereof in the accompanying sheet of drawings which I will now describe.

Figure 2:
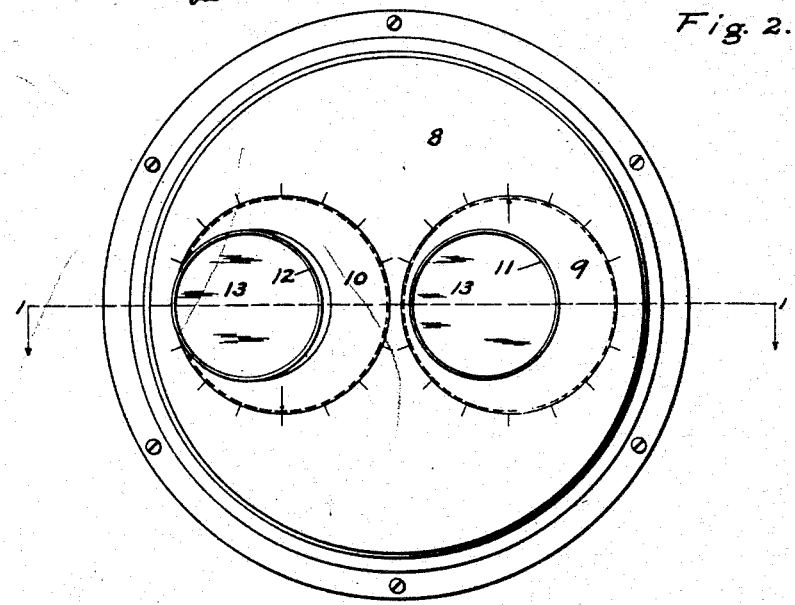

Figure 1 is a horizontal sectional view of a camera lens embodying my invention, taken on line 1—1 of Fig. 2; and Fig. 2 is a front view of a camera lens embodying my invention.

Referring now more in detail to the drawings, 1 designates a portion of the camera body to which is detachably secured a supporting barrel 2. Adjustably mounted in said supporting barrel 2, is a lens barrel 3, provided at its rear end with a detachable disk, or plate 4, within which is detachably and adjustably mounted a lens thimble 5, carrying the main lens 6, which can be either a compound or a single lens, being shown here as a compound lens. Within said lens barrel is mounted the usual diaphragm 7. Mounted in the opposite end of said lens barrel 3, is a plate 8, provided with two threaded openings adapted to receive the disk-like lens carrying plates 9 and 10, said lens carrying plates being here shown as of convexed form and being provided with eccentrically positioned threaded openings within which are adjustably mounted two directing lens thimbles 11 and 12, each of which is provided with compound lenses 13—13, with diaphragms 14—14 therebetween. It will be understood, of course, that these directing lenses may be either single or compound, depending upon the use for which they are intended.

It will be noted that the construction of the plate 8, and the lens carrying plates 9 and 10, is such as will give a general convexed form to the entire end structure. It will also be noted that by reason of the convexity in the lens carrying plates 9 and 10, and by reason of the eccentric positions of the lens thimbles therein, that any adjustments of the lens carrying plates 9 and 10, change the angular positions of the lens thimbles 11 and 12, and the lenses therein, relative to the main lens 6. In the drawings, it will be noted that the lens carrying plate 9, is turned so as to bring its lens thimble 11, toward the middle of the lens barrel 3, while the lens carrying plate 10 is adjusted so as to position the lens thimble 12, toward the edge of the lens barrel, and at the same time giving it a greater angle than has the lens thimble 11, which is more nearly the center of the barrel. By reason of this adjustment, objects, or images, at a considerable distance apart may be taken and directed through the main lens and through the aperture in the aperture plate in the reproduction of said images. By means of the diaphragms 14—14, which are mounted within the lens thimbles 11 and 12, one or both of said directing lenses may be closed, or cut off until it is desired to direct the image for which it is positioned through the main lens. This makes it possible for the operator to open and close the directing lenses at will, either separately or together. Special attention is also called to the fact that the entire end structure, that is the plate 8, together with the directing lenses may be bodily removed at will, and the ordinary single lens substituted for it, thus making it possible to embody my invention as an attachment which can be applied to lens barrels already in use.

I am aware that many changes in details can be made in my invention as here embodied for purposes of illustration, without departing from the spirit thereof, and I do not limit the invention to this particular embodiment, except as I may be limited by the hereto appended claims.

I claim:

1. A camera lens comprising in combination a lens barrel, a main lens therein, and a plurality of directing lenses all positioned to direct images through said main lens.

2. A camera lens comprising in combination a lens barrel, a main lens mounted in one end thereof, and a plurality of directing lenses adjustably mounted in the other end thereof, and each adapted to direct a different image through said main lens.

3. A camera lens of the character referred to, comprising in combination with a lens barrel having a main lens therein, a detachable lens plate at the opposite end of said lens barrel, said lens plate being provided with a plurality of directing lenses set therein at angles to said main lens, whereby to direct a plurality of images simultaneously through said main lens.

4. A camera lens of the character referred to, comprising in combination with a lens barrel having a main lens therein, a detachable lens plate at the opposite end of said lens barrel, said lens plate being provided with a plurality of directing lenses set therein and adjustable relative to each other and to said main lens, whereby to direct a plurality of images simultaneously through said main lens.

5. In combination with a camera lens barrel having a main lens in one end thereof, a convexed lens plate mounted in the opposite end thereof, and provided with a plurality of directing lenses therein, positioned at angles to said main lens, whereby to direct different images simultaneously through said main lens.

6. In combination with a camera lens barrel having a main lens in one end thereof, a convexed lens plate mounted in the opposite end thereof, and provided with a plurality of directing lenses therein, and capable of adjustment relative to each other and to said main lenses, whereby to direct different images simultaneously through said main lens.

7. In combination with a camera lens barrel having a main lens in one end thereof, a lens plate mounted in the other end thereof, a plurality of lens carrying plates adjustably mounted in said lens plate, and a directing lens eccentrically positioned in each of said lens carrying plates, whereby to be adjusted relative to each other and to said main lens.

8. In combination with a camera lens barrel having a main lens in one end thereof, a lens plate mounted in the other end thereof, a plurality of convexed lens carrying plates adjustably mounted therein, and a directing lens eccentrically positioned in each of said lens carrying plates, whereby to be adjusted relative to each other and to said main lens.

9. A camera lens comprising in combination a lens barrel, a main lens therein, a plurality of directing lenses all positioned to direct images through said main lens, and means for closing each of said directing lenses at will.

10. A camera lens of the character referred to, comprising in combination a lens barrel, a main lens mounted in one end thereof, a plurality of directing lenses mounted in the opposite end thereof at different angles relative to said main lens, whereby to direct different images through said main lens, and a diaphragm for one, or more of said directing lenses for rendering the same inoperative at will, substantially as described.

Signed at Portland, Multnomah county, Oregon, this 13 day of October, 1915.

GEORGE E. WATTS.

In presence of—
  I. M. GRIFFIN,
  J. C. STRENG.

Copies of this patent may be obtained for five cents each, by addressing the "Commissioner of Patents, Washington, D. C."